(12) United States Patent
Yasuda (10) Patent No.: US 8,950,917 B2
(45) Date of Patent: Feb. 10, 2015

(54) VEHICULAR LAMP

(75) Inventor: Yuji Yasuda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 101 days.

(21) Appl. No.: 13/591,823

(22) Filed: Aug. 22, 2012

(65) Prior Publication Data

US 2013/0051053 A1 Feb. 28, 2013

(30) Foreign Application Priority Data

Aug. 24, 2011 (JP) ................. 2011-182097

(51) Int. Cl.
*B60Q 1/00* (2006.01)
*F21V 7/00* (2006.01)
*F21V 29/00* (2006.01)
*F21S 8/10* (2006.01)

(52) U.S. Cl.
CPC ......... *F21S 48/1109* (2013.01); *F21S 48/1159* (2013.01); *F21S 48/212* (2013.01); *F21S 48/215* (2013.01)
USPC ............ 362/516; 362/509; 362/538; 362/539

(58) Field of Classification Search
CPC ........................................................ B60Q 1/00
USPC .................. 362/509, 516, 538, 539
See application file for complete search history.

(56) References Cited

U.S. PATENT DOCUMENTS

| | | | |
|---|---|---|---|
| 8,523,416 B2 * | 9/2013 | Ohmi et al. ................ | 362/538 |
| 2007/0177401 A1 | 8/2007 | Nakabayashi | |
| 2008/0253127 A1 * | 10/2008 | Willwohl et al. ............ | 362/294 |
| 2010/0008095 A1 | 1/2010 | Tsukamoto | |
| 2010/0271783 A1 | 10/2010 | Miyashita | |
| 2012/0188763 A1 * | 7/2012 | Yamakawa et al. ........... | 362/235 |

FOREIGN PATENT DOCUMENTS

| | | |
|---|---|---|
| CN | 101872080 | 10/2010 |
| CN | 102074558 A | 5/2011 |
| CN | 201926801 U | 8/2011 |
| JP | 2006-302714 A | 11/2006 |
| JP | 2008-153080 A | 7/2008 |
| JP | 2010-020917 A | 1/2010 |
| JP | 2011-070791 A | 4/2011 |

OTHER PUBLICATIONS

Chinese Office Action issued May 5, 2014 in Chinese Patent Application No. 201210287222.7.
Chinese Office Action issued Sep. 12, 2014 in Chinese Patent Application No. 201210287222.7.

* cited by examiner

*Primary Examiner* — Stephen F Husar
*Assistant Examiner* — James Cranson, Jr.
(74) *Attorney, Agent, or Firm* — Sughrue Mion, PLLC

(57) ABSTRACT

In a vehicular lamp in which a light source unit that includes an LED as a light source and an optical element is attached to a heat sink, and an LED module in which the LED is mounted to a power supply substrate is pressed against and fixed to a substrate mounting surface of the heat sink via an attachment, a plurality of positioning protrusions that abut an outside edge of the power supply substrate are provided around the substrate mounting surface, and a groove that extends along an outer peripheral surface of each protrusion is provided on at least a side of a base of the protrusion, the side of the base facing the substrate mounting surface.

11 Claims, 9 Drawing Sheets

VEHICULAR LAMP

INCORPORATION BY REFERENCE

The disclosure of Japanese Patent Application No. 2011-182097 filed on Aug. 24, 2011 including the specification, drawings and abstract is incorporated herein by reference in its entirety.

BACKGROUND OF THE INVENTION

1. Field of the Invention

The invention relates to a vehicular lamp in which a light source unit provided with at least a light emitting diode (LED) that is a light source and a reflector that reflects the light from the light source in a predetermined direction is attached to a heat sink and housed inside a lamp chamber. More particularly, the invention relates to a vehicular lamp in which a power supply substrate on which an LED chip is mounted is attached via an attachment at a predetermined position on a heat sink.

2. Description of Related Art

In recent years there has been much development with vehicular front lamps that use LEDs as light sources. In this type of front lamp, a light source unit formed of an LED as the light source and optical elements (a reflector and a projection lens and the like) that control the emitted light of the LED in a predetermined direction is integrally attached to a heat sink as a support member of the light source unit and is housed in a lamp chamber.

The LED is typically configured as a power supply substrate (hereinafter, referred to as an "LED module") on which an LED chip is mounted. In order to stably maintain light emitting efficiency of the LED chip over an extended period of time, it is desirable to attach the LED module (i.e., the power supply substrate thereof) so that it is in close contact with the heat sink to ensure that heat is transferred to the heat sink (i.e., to ensure heat dissipation via the heat sink). In a vehicular front lamp (i.e., a light source unit), it is preferable that the LED module be accurately positioned at a predetermined position on the heat sink in order to create the proper light distribution.

In Japanese Patent Application Publication No. 2008-153080 (JP 2008-153080 A), an LED module is positioned at a predetermined position on a heat sink and attached in a closely contacting state, by covering the LED module from above with a frame-shaped flat plate attachment that has an opening in a center portion thereof, and screwing the attachment to the heat sink with the attachment surrounding the LED chip.

Also, in Japanese Patent Application Publication No. 2010-20917 (JP 2010-20917 A), an LED module is fixed with screws to a module mounting surface of a base provided on a heat sink. The LED module is accurately positioned by a plurality of pins that protrude so as to surround the module mounting surface.

However, with the technology described in JP 2008-153080 A, there is a gap, though be it small, between the LED module and the frame-shaped flat plate attachment that surrounds the LED module. As a result, there is a limit to the accuracy in positioning the LED module.

With the structure in which the LED module is positioned by pins that protrude out surrounding a module mounting surface (JP 2010-20917 A), accurate positioning is theoretically possible. However, because the heat sink having the module mounting surface with the protruding pins is formed by a die-cast product or a press formed product made of metal such as aluminum or magnesium, an R-portion 204a is formed on a base (i.e., a base portion) of a pin 204, as shown in the enlarged view in FIG. 10. That is, the pin 204 stands upright via the R-portion 204a from the module mounting surface 202 on the base (i.e., the base portion).

Figure 10:
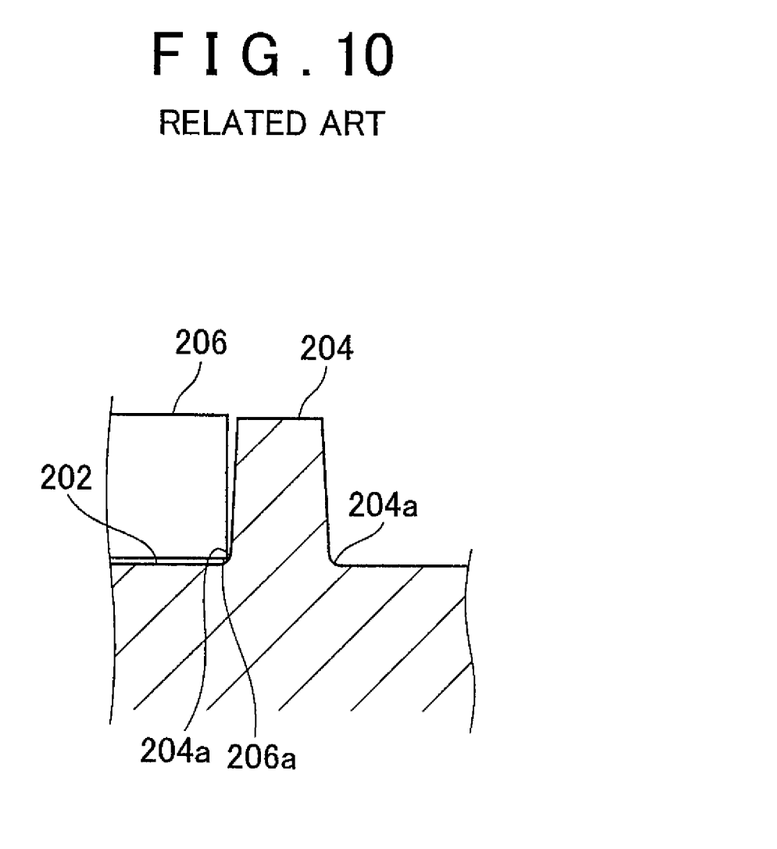
FIG. 10 is an enlarged longitudinal sectional view of an LED module positioning pin according to related art.

Therefore, a peripheral edge corner portion 206a of a power supply substrate 206 formed with a rectangular cross-section interferes with the R-portion 204a of the base (i.e., the base portion) of the pin 204, so that there is a possibility that accurate positioning cannot be performed.

More specifically, when the peripheral edge corner portion 206a of the power supply substrate 206 rides up on the R-portion 204a of the pin base (i.e., the base portion), the power supply substrate 206 is unable to closely contact the module mounting surface 202, so that there is a possibility that heat is not sufficiently transferred to the module mounting surface 202 side (i.e., the heat transfer efficiency may decrease).

SUMMARY OF THE INVENTION

The invention provides a vehicular lamp in which appropriate light distribution is created by light emitted from a light emitting diode (LED) that is a light source, by accurately positioning an LED module on a substrate mounting surface of a heat sink and fixing the accurately positioned LED module to the substrate mounting surface of the heat sink.

A vehicular lamp according to an aspect of the invention includes a lamp chamber defining portion that defines a lamp chamber therein; a light source unit that is housed in the lamp chamber and includes a light emitting diode (LED) that is a light source, and an optical element that controls a light distribution of light from the light source in a predetermined direction; and a heat sink to which the light source unit is attached. The LED is provided in the form of a LED module in which an LED chip is mounted to a power supply substrate. The LED module is pressed against and fixed to a substrate mounting surface provided at a predetermined position on the heat sink, by a frame-shaped attachment that has an LED module pressing portion. A plurality of positioning protrusions that abut an outside edge of the power supply substrate of the LED module are provided around the substrate mounting surface. Also, a groove that extends along an outer peripheral surface of each of the protrusions is provided on at least a side of a base of each of the protrusions, the side of the base facing the substrate mounting surface.

Figure 8:
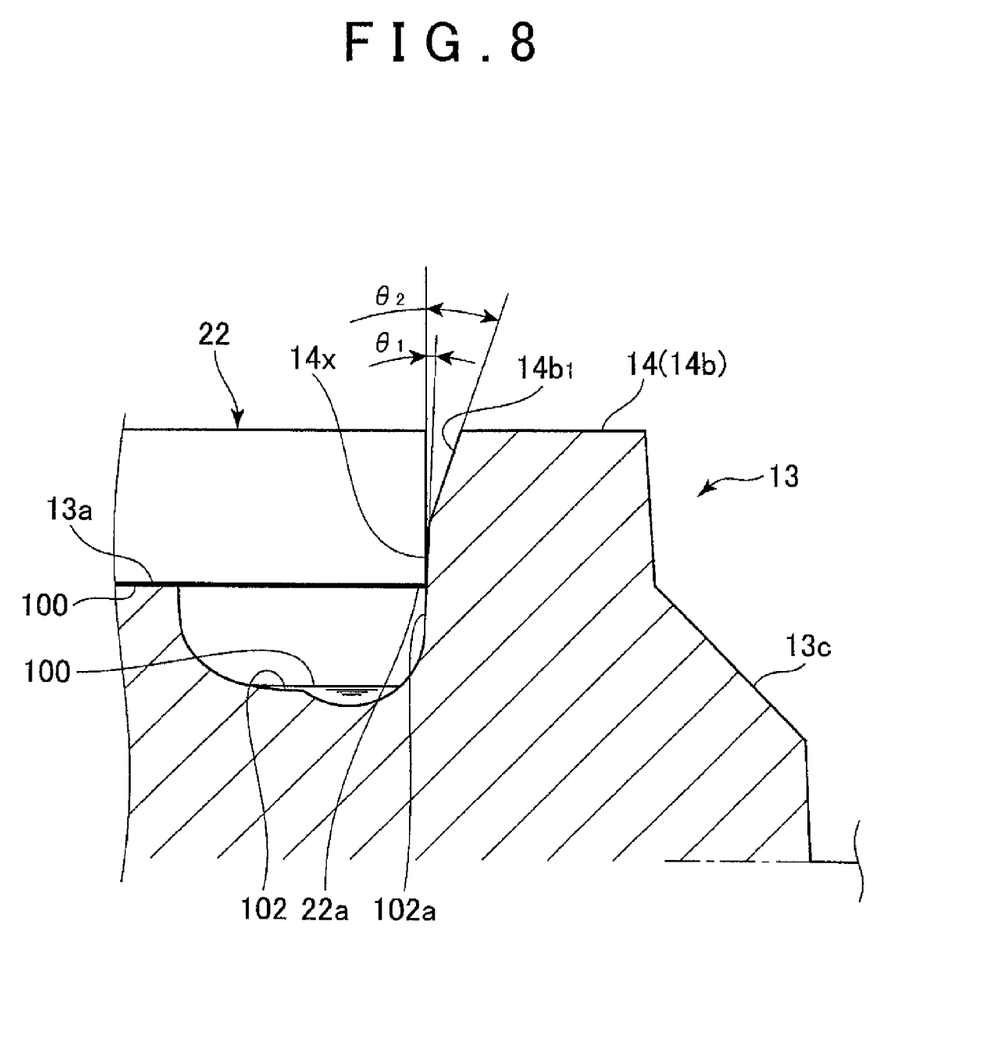
FIG. 8 is an enlarged longitudinal sectional view (i.e., a sectional view taken along line VIII-VIII in FIG. 6) of an LED module positioning protrusion and a groove that serves an excess grease pit.

Because the outer peripheral surfaces of the positioning protrusions on the side facing the substrate mounting surface extend below the substrate mounting surface as side surfaces of the grooves, i.e., because the outer peripheral surfaces of the positioning protrusions are continuous with the side surfaces of the grooves, the outer peripheral surfaces of the positioning protrusions that abut the outside edge of the power supply substrate are substantially perpendicular to the plane including the substrate mounting surface until a position beyond the substrate mounting surface, as shown in FIG. 8.

Therefore, it is ensured that corner portions of the outside edges of the power supply substrate that has a rectangular shape abut the outer peripheral surfaces (i.e., the outer peripheral surfaces that are substantially perpendicular to the plane including the substrate mounting surface) of the positioning protrusions and in this way, the LED module is positioned. As a result, the LED module is accurately positioned with respect to the substrate mounting surface. In addition, it is ensured that the bottom surface of the power supply substrate is in close contact with the substrate mounting surface, so that the efficiency in transferring heat generated by the LED module that is the light source to the heat sink is also excellent.

The contact area between the power supply substrate and the substrate mounting surface is reduced by an amount corresponding to the area of the grooves and therefore, the efficiency in transferring heat to the heat sink may decrease. However, the grooves are provided on the peripheral edge side of the substrate mounting surface, and moreover, with the LED module, even though the amount of heat generated near the center portion of the power supply substrate where the LED chip is mounted is large, the amount of heat generated on the peripheral edge side thereof is small and therefore, the decrease in the efficiency in transferring heat to the heat sink is very small. That is, the influence of the decrease in the heat transfer efficiency is limited to only the peripheral edge side of the substrate mounting surface that corresponds to the peripheral edge side of the power supply substrate where the amount of heat generated is small. Therefore, the decrease in the heat transfer efficiency of the substrate mounting surface as a whole is small and therefore, there is almost no influence on the efficiency in transferring heat generated by the LED module that is the light source to the heat sink.

As is evident from the above description, the invention makes it possible to provide a vehicular lamp in which appropriate light distribution using an LED as the light source is obtained over an extended period of time because the LED module is accurately positioned on the substrate mounting surface of the heat sink and it is ensured that the LED module is attached in close contact with the substrate mounting surface of the heat sink.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described.

FIGS. 1 to 9 are diagrams showing an embodiment in which the invention is applied to a vehicular front lamp. In this vehicular front lamp 1, a projection light source unit 50 and a reflective (parabola) light source unit 60, both of which have an LED that will be described later as the light source, are housed in a lamp chamber S that is defined by a lamp chamber defining portion formed of a lamp body 2 and a front cover (outer lens) 4 that is attached to a front end open portion of the lamp body 2, as shown in detail in FIGS. 1 and 2 in particular. The projection light source unit 50 and the reflective light source unit 60 are integrally attached one above the other on a front surface side of a heat sink 10 that will be described later. The reflective light source unit 60 is arranged abutting the vertically underside of the projection light source unit 50, so that the emitting patterns of the light source units 50 and 60 combine to create a predetermined sophisticated low beam light distribution pattern.

Also, the heat sink 10 to which the light source units 50 and 60 are integrally attached is supported so as to be able to rotate horizontally with respect to an aluminum die-cast lamp housing 6 that has a rectangular frame shape when viewed from the front. The heat sink 10 is able to swivel (pivot) about a swivel axis Lz by a swivel motor M provided via a joint assembly 8 on a lower surface wall of the lamp housing 6.

Hereinafter, each of the structures will be described in detail.

An LED (a semiconductor light-emitting element) that serves as a light source is an LED module 20 that emits white light, in which an LED chip 21 is mounted by being adhered by an adhesive 25 to an upper center portion of a conductive insulated power supply substrate (ceramic, for example) 22 that is rectangular in a plan view and dissipates heat well, as shown in detail in FIGS. 3 to 5 and 7. A power supply portion 24 for a cathode and an anode is formed on both sides in the longitudinal direction on an upper surface of the power supply substrate 22.

Figure 1:
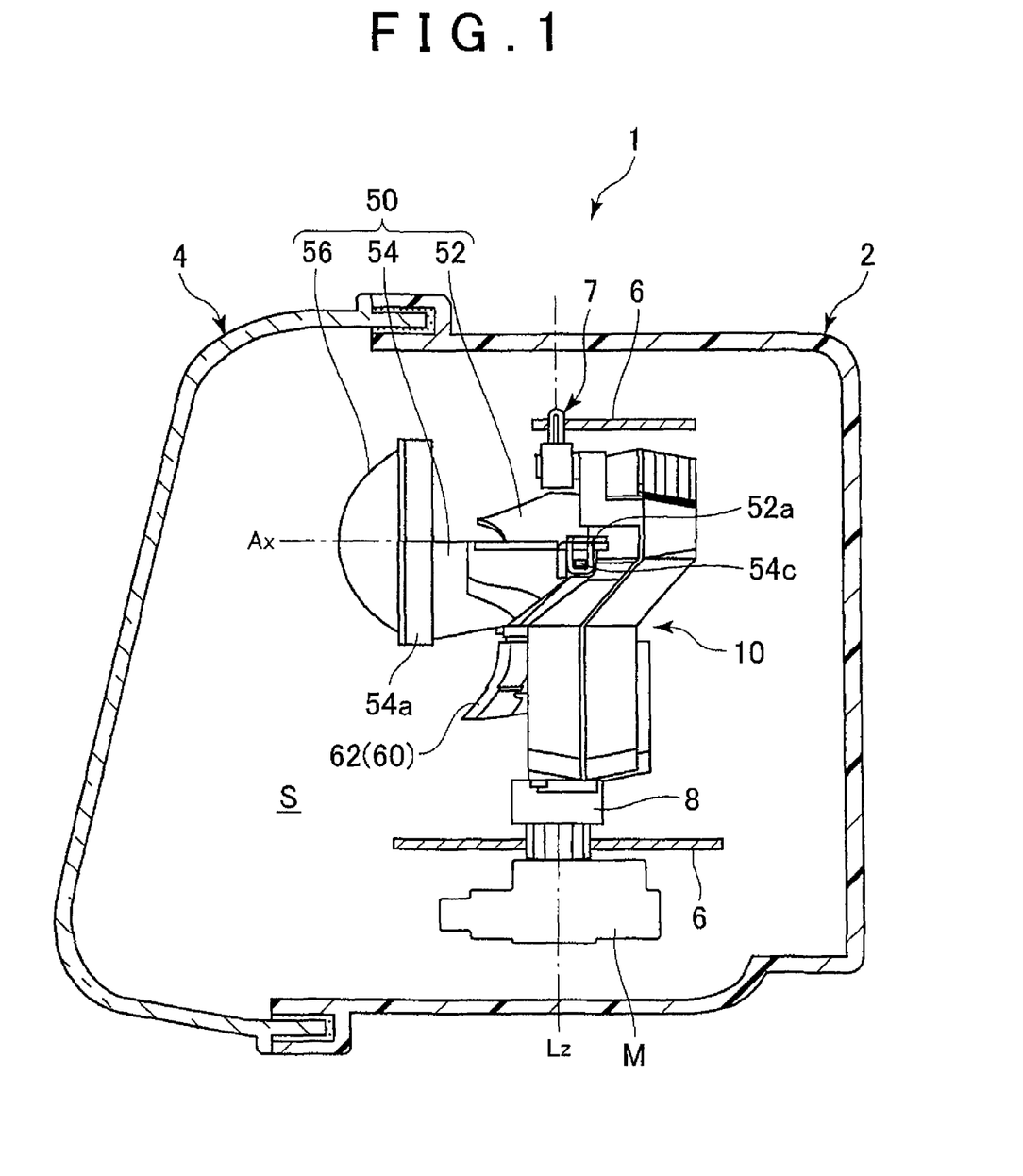
FIG. 1 is a longitudinal sectional view of a vehicular front lamp according to an embodiment of the invention.
Figure 2:
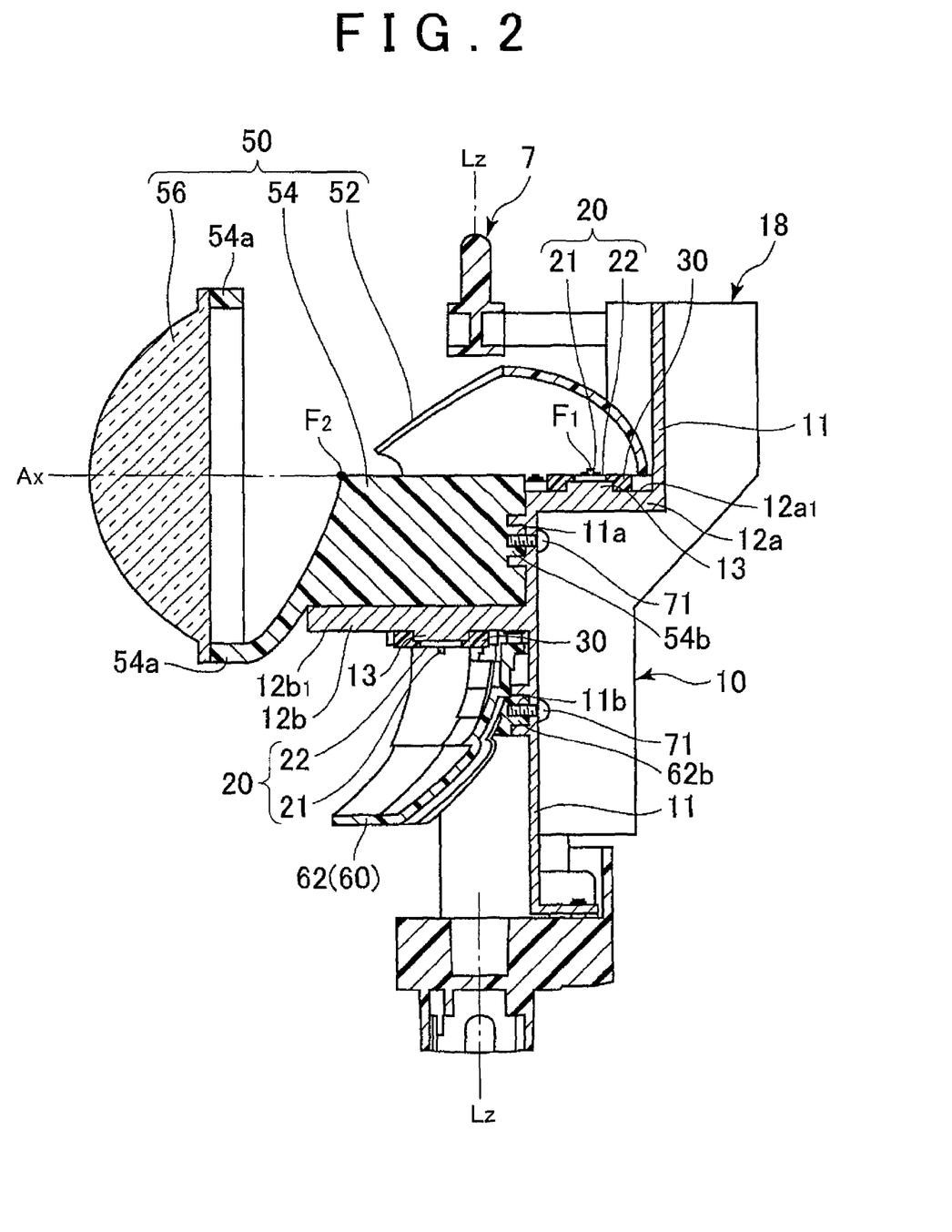
FIG. 2 is a longitudinal sectional view of a light source unit attached to a heat sink.

The heat sink 10 to which the light source units 50 and 60 are attached (i.e., fixed) is aluminum die-cast, the main component of which is aluminum, that has a rectangular shape when viewed from the front. As shown in FIG. 2, the heat sink 10 includes a perpendicular panel portion 11 for screwing on (i.e., fixing) the light source units 50 and 60, an upper level portion 12a to which an LED module 20 that is the light source of the projection light source unit 50 is fixed, and a lower level portion 12b to which the LED module 20 that is the light source of the reflective light source unit 60 is fixed. A radiation fin 18 for promoting heat dissipation of the light source units 50 and 60 is integrally formed on the entire back surface side of the perpendicular panel portion 11 and at a predetermined position on a front surface side of the perpendicular panel portion 11 (i.e., a position that will not impede fixation of the projection light source unit 50 to the perpendicular panel portion 11). Also, a shaft 7 for swiveling the light source units 50 and 60 about the swivel axis Lz is attached above the heat sink 10.

Further, a screw insertion hole 11a for screwing (i.e., fixing) the projection light source unit 50 to the heat sink 10 is provided in substantially the center portion of the perpendicular panel portion 11 between the upper level portion 12a and the lower level portion 12b, while a screw insertion hole 11b for screwing (i.e., fixing) the reflective light source unit 60 to the heat sink 10 is provided in substantially the center portion of the perpendicular panel portion 11 below the lower level portion 12b.

A light source base 13 that is a substrate mounting portion of the LED module 20 for the projection light source unit 50 is integrally formed at a center portion in the vehicle width direction (i.e., the right-left direction) of an upper surface $12a_1$ of the upper level portion 12a of the heat sink 10. The upper surface $12a_1$ around this light source base 13 is a surface (i.e., an attachment mounting surface 15) that abuts a mounting surface 35 of an attachment 30 that will be described later, that mounts onto the heat sink 10 (see FIGS. 3 and 5).

Further, attachment positioning protrusions 16 that fit into positioning holes 33c provided in the attachment 30, and attachment mounting screw holes 17 into which attachment mounting screws 70 that are fixing members for the attachment, are provided adjacent to each other at predetermined positions on the attachment mounting surface 15. Also, a recessed portion $12a_2$ for housing a socket portion 31 of the attachment 30 is provided at a predetermined position in the upper level portion 12a.

Meanwhile, similar to the upper level portion 12a, a light source base 13 for installing the LED module 20 for the reflective light source unit 60, attachment positioning protrusions 16, and attachment mounting screw holes 17 are provided in a center portion, in the vehicle width direction, of a lower surface $12b_1$ of the lower level portion 12b of the heat sink 10, and a recessed portion $12b_2$ for housing a socket portion 31 of the attachment 30 is provided in a predetermined position of the lower level portion 12b, inclined 10° with respect to the vehicle width direction (i.e., the right-left direction).

As shown in FIGS. 3 to 8, the light source base 13 that is the substrate mounting portion is a rectangular base that is slightly larger than the power supply substrate 22 of the LED module 20. A substrate mounting surface 13a that is rectangular in a plan view and that matches the outer shape of the power supply substrate 22 of the LED module 20 is defined by LED positioning protrusions 14 provided at the four corners on the upper surface of the light source base 13, and the LED module 20 is mounted to this substrate mounting surface 13a.

The LED positioning protrusions 14 provided at substantially the four corners surrounding the substrate mounting surface 13a include a total of eight protrusions for positioning the power supply substrate 22 in the front-back and right-left directions in order to accurately place the power supply substrate 22 of the LED module 20 on the substrate mounting surface 13a.

More specifically, the LED positioning protrusions 14 each have an elliptical cross section, and position the power supply substrate 22 in the front-back direction by protrusions 14a in which the major axis direction of the ellipse is aligned with the front-back direction, and position the power supply substrate 22 in the right-left direction (i.e., the longitudinal direction of the power supply substrate 22) by protrusions 14b in which the major axis direction of the ellipse is aligned with the right-left direction, so that all eight protrusions 14 work together to position the power supply substrate 22 circumferentially (see FIGS. 3, 4, 6, and 7).

The LED positioning protrusions 14 that define the substrate mounting surface 13a are provided near the four corners that are positions that are as far apart as possible from one another on the substrate mounting surface 13a that is rectangular in a plan view. The positioning accuracy of the LED module 20 with respect to the substrate mounting surface 13a is increased by the four corners of the power supply substrate 22 being positioned in this way.

Also, abutting portions of the LED positioning protrusions 14a and 14b that abut side edge portions of the power supply substrate 22 are formed by end surfaces in the major axis direction of the ellipses of the cross section of the protrusions. The power supply substrate 22 of the LED module 20 can be accurately placed on the predetermined substrate mounting surface 13a defined by the protrusions 14, by all eight locations near the four corners of the power supply substrate 22 that is rectangular in a plan view abutting against outer peripheral surfaces at the base portions of the protrusions 14a and 14b.

Also, heat transfer grease 100 for increasing the closeness of contact between the power supply substrate 22 and the substrate mounting surface 13a is filled between the substrate mounting surface 13a and the power supply substrate 22 of the LED module 20, as shown in FIG. 8. A groove 102 that serves as an excess grease pit extends along the outer peripheral surface of the protrusions 14 on the side facing the substrate mounting surface 13a of the bases of the LED positioning protrusions 14.

That is, the groove 102 is formed extending across the bases of the protrusions 14a and 14b at each of the four corners of the substrate mounting surface 13a. When the LED module 20 is pressed against and fixed to the substrate mounting surface 13a via the attachment 30 that will be described later, excess heat transfer grease 100 that is squeezed out from between the power supply substrate 22 and the substrate mounting surface 13a will collect in this groove 102.

Also, as a result of providing the groove 102 along the outer peripheral surface of the protrusion 14, an outer peripheral surface 14x of the positioning protrusion 14 on the side facing the substrate mounting surface 13a extends below the substrate mounting surface 13a, forming a side surface 102a of the groove 102, as shown in FIG. 8. That is, the outer peripheral surface 14x of the positioning protrusion 14 that abuts the outside edge of the power supply substrate 22 is continuous with the side surface 102a of the groove 102 and is substantially perpendicular to the substrate mounting surface 13a.

Therefore, it is ensured that the corner portions 22a of the outside edges of the power supply substrate 22 that has a rectangular sectional shape abut the outer peripheral surfaces (i.e., the outer peripheral surfaces that extend intersecting the plane including the substrate mounting surface 13a) 14x of the positioning protrusions 14 and in this way, the LED module 20 is positioned. As a result, the LED module 20 can be accurately positioned with respect to the substrate mounting surface 13a, and it is ensured that the bottom surface of the power supply substrate 22 is in close contact with the substrate mounting surface 13a.

Providing the grooves 102 substantially reduces the contact area between the power supply substrate 22 and the substrate mounting surface 13a by an amount corresponding to the area of the grooves 102 and therefore, the efficiency in transferring heat to the heat sink 10 may also decrease. However, the grooves 102 are provided at the four corners of the substrate mounting surface 13a, and moreover, with the LED module 20, even though the amount of heat generated near the center portion of the power supply substrate 22 where the LED chip 21 is mounted is large, the amount of heat generated on the peripheral edge side that includes the four corners of the substrate 22 is small and therefore, the decrease in efficiency of heat transfer to the heat sink 10 is very small. That is, the influence of the decrease in the heat transfer efficiency is limited to only the four corners of the substrate mounting surface 13a that correspond to the four corners of the power supply substrate 22 where the amount of heat generated is small. Therefore, the decrease in the heat transfer efficiency of the substrate mounting surface 13a as a whole is small and therefore, there is almost no influence on the efficiency in transferring heat generated by the LED module 20 that is the light source to the heat sink 10.

Also, the positioning protrusions 14a and 14b have a die extraction taper angle, or draft angle, θ1 (for example, 3°), so that separating the molded heat sink 10 from the die is easy. Moreover, inclined surfaces $14a_1$ and $14b_1$ that have a taper angle θ2 (for example, 20°) formed parallel to each side of the rectangular substrate mounting surface 13a, and that guide the LED module 20 onto the substrate mounting surface 13a, are formed on the sides of tip end portions of the positioning protrusions 14a and 14b that face the substrate mounting surface 13a, so that the LED module 20 can be smoothly placed on the substrate mounting surface 13a (see FIG. 8).

That is, to place the LED module 20 on the substrate mounting surface 13a, the LED module 20 is lowered from a position above the substrate mounting surface 13a so as to engage with the region surrounded by the eight positioning protrusions 14 while being kept parallel. The area (i.e., the amount of space) surrounded by the tip end portions of the positioning protrusions 14 is somewhat larger than the area (i.e., the amount of space) of the substrate mounting surface 13a because the inclined surfaces $14a_1$ and $14b_1$ are formed on the tip end portions of the protrusions 14, so that the LED module 20 easily engages with the region surrounded by the tip end portions of the positioning protrusions 14, and when the LED module 20 is lowered, the side edge portions of the power supply substrate 22 slide along the inclined surfaces $14a_1$ and $14b_1$ of the tip end portions of the positioning protrusions 14, so that the work of placing the LED module 20 (i.e., the power supply substrate 22 thereof) on the substrate mounting surface 13a can be performed smoothly.

Figure 6:
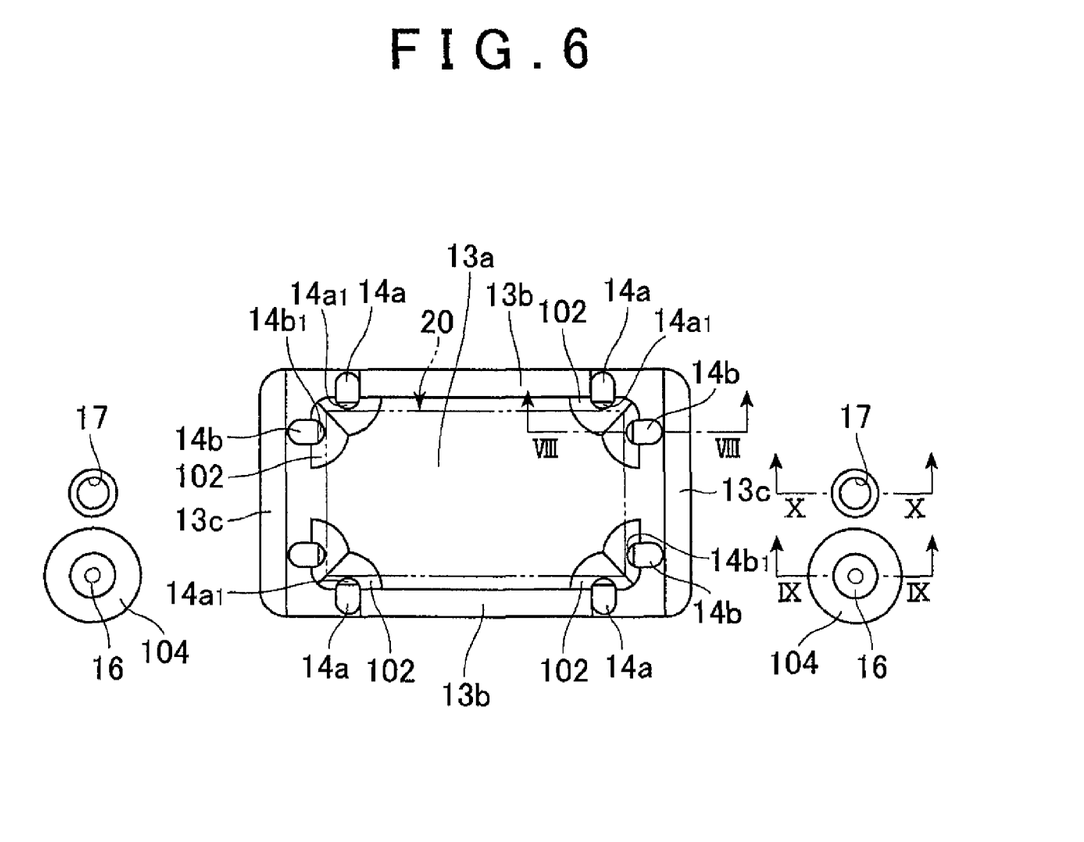
FIG. 6 is an enlarged plan view of the area around a substrate mounting surface.
Figure 7:
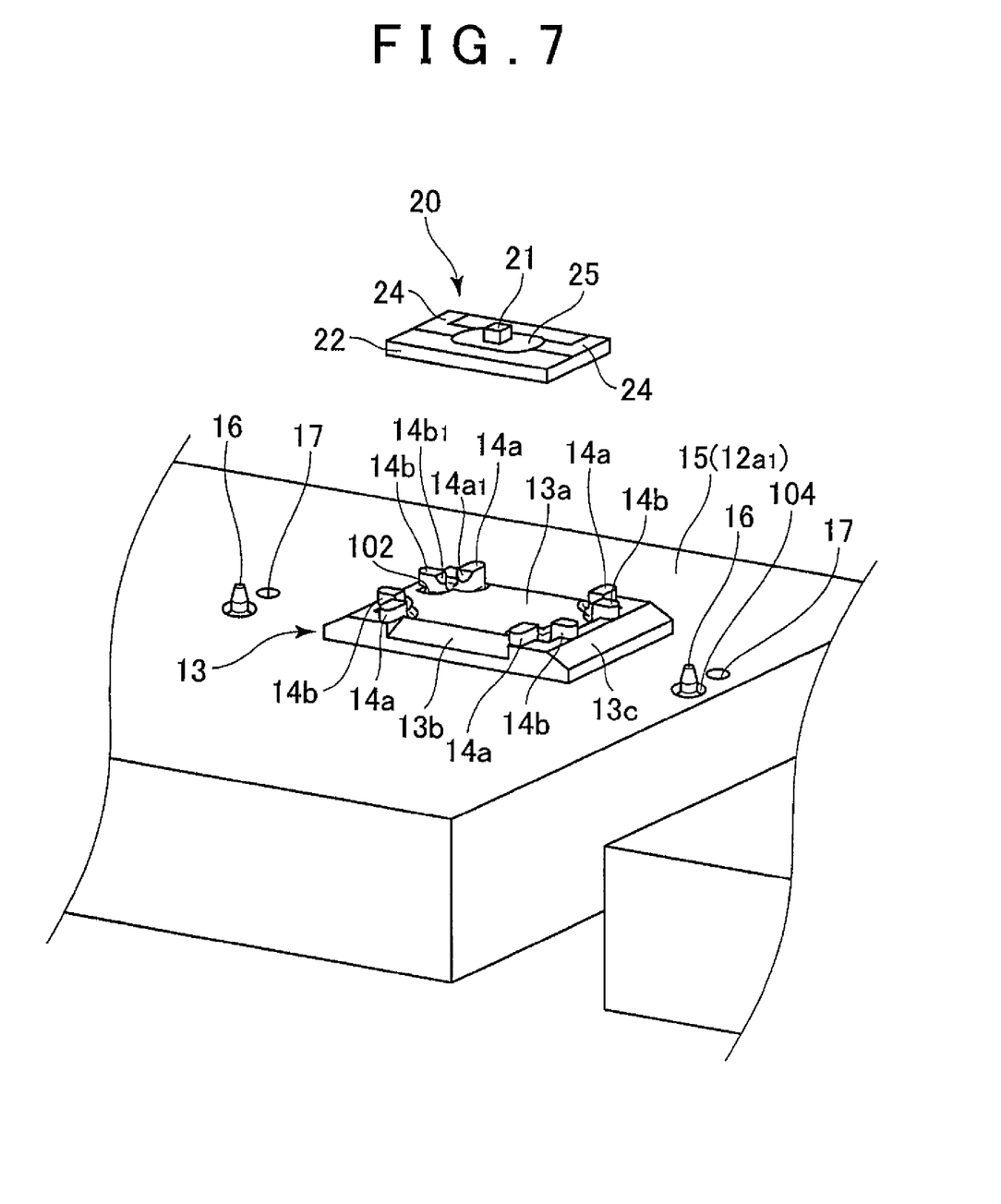
FIG. 7 is an enlarged perspective view of the area around the substrate mounting surface.

Reference characters 13b and 13c in FIGS. 6 and 7 denote inclined surfaces that are provided on side edge portions of the light source base 13 and are used to detect the substrate mounting surface 13a by image processing.

Next, a structure characteristic of this embodiment, in which the LED module 20 that is employed as a light source of a vehicular front lamp is positioned on and fixed to the substrate mounting surface 13a provided on the heat sink 10, will now be described.

The light emitting portion of the LED module 20 is a very small LED chip 21 that is mounted on the power supply substrate 22 and therefore, if the mounting position of the LED module 20 with respect to the substrate mounting surface 13a is misaligned even slightly in not just two-dimensional directions, but a circumferential direction, the light distribution created by the light source unit 50 will be different. Thus, it is desirable that the LED module 20 be accurately positioned in the two-dimensional directions and the circumferential direction, with respect to the substrate mounting surface 13a.

Further, in order to keep the light emitting efficiency of the LED chip 21 stable over an extended period of time, it is desirable to ensure that the LED module 20 (i.e., the power supply substrate 22 thereof) is attached in close contact with the substrate mounting surface 13a to ensure heat transfer from the substrate mounting surface 13a to the heat sink 10 (i.e., to ensure heat dissipation of heat generated on the LED module 20 side, via the heat sink).

Therefore, first the LED positioning protrusions 14 are provided in eight locations near the four corners, that are positions as far apart as possible from each other, at positions surrounding the substrate mounting surface 13a that is rectangular in a plan view so that the power supply substrate 22 that is rectangular in a plan view abuts these LED positioning protrusions 14 at eight locations near the four corners of the power supply substrate 22. As a result, the accuracy with which the LED module 20 is positioned in the two-dimensional directions and the circumferential direction with the respect to the substrate mounting surface 13a is increased.

Second, the groove 102 that extends in an arc-shape along the outer peripheral surface 14x (see FIG. 8) of each protrusion 14 is provided on the side of each protrusion 14 that faces the substrate mounting surface 13a, and the outer peripheral surface 14x of the positioning protrusion 14 extends downward below the substrate mounting surface 13a. As a result, the accuracy with which the LED module 20 is positioned in the two-dimensional directions and the circumferential direction with respect to the substrate mounting surface 13a is further increased.

That is, the outer peripheral surface 14x of the positioning protrusion 14 that abuts the outside edge of the power supply substrate 22 is continuous with the side surface 102a of the groove 102, and substantially perpendicular to the plane including the substrate mounting surface 13a. Therefore, it is ensured that the corner portions 22a of the periphery, having a rectangular section, of the power supply substrate 22 abut the outer peripheral surfaces 14x (i.e., the outer peripheral surfaces that extend intersecting the plane including the substrate mounting surface 13a) of the positioning protrusions 14 and in this way, the LED module 20 is positioned. As a result, the LED module 20 can be accurately positioned with respect to the substrate mounting surface 13a, and it is ensured that the bottom surface of the power supply substrate 22 is in close contact with the substrate mounting surface 13a.

Third, the heat transfer grease 100 is filled between the power supply substrate 22 and the substrate mounting surface 13a, and the groove 102 provided along the outer peripheral surface of each positioning protrusion 14 is used as an excess grease pit. As a result, it is possible to increase the efficiency in transferring heat generated by the LED module 20 that is the light source to the heat sink 10, and excess grease will not adhere around the LED module 20.

That is, to attach the LED module 20 to the substrate mounting surface 13a, first heat transfer grease (that is gel-like) 100 is supplied onto the substrate mounting surface 13a. Then the LED module 20 is placed on the light source base 13. Last, the LED module 20 is pressed against and fixed to the substrate mounting surface 13a by fixing an attachment 30 to the heat sink 10 so as to cover the LED module 20. When the LED module 20 is pressed against and fixed to the substrate mounting surface 13a via the attachment 30, the heat transfer grease 100 that has been supplied to substantially the center portion of the substrate mounting surface is pressed so that it spreads outward along the substrate mounting surface 13a. As a result, the power supply substrate 22 is caused to be in close contact with the substrate mounting surface 13a via a thin film-like layer of the heat transfer grease.

The heat transfer grease filled between the power supply substrate 22 and the substrate mounting surface 13a increases the closeness of contact between the power supply substrate 22 and the substrate mounting surface 13a, and thus promotes the transfer of heat generated on the LED module 20 side to the substrate mounting surface 13a side. As a result, the efficiency in transferring heat generated by the LED module 20 that is the light source to the heat sink 10 increases.

Further, when the LED module 20 is pressed against and fixed to the substrate mounting surface 13a, excessive part of the heat transfer grease 100 filled between the power supply substrate 22 and the substrate mounting surface 13a does not leak out to the outside of the power supply substrate 22, but is instead led to the grooves 102 that serve as grease pits and is retained there. As a result, problems such as excess grease adhering to the area around the LED module 20 and making it dirty, or the current path of the LED module 20 shorting due to excess grease will not occur.

Next, the structure of the attachment 30 will be described.

Figure 3:
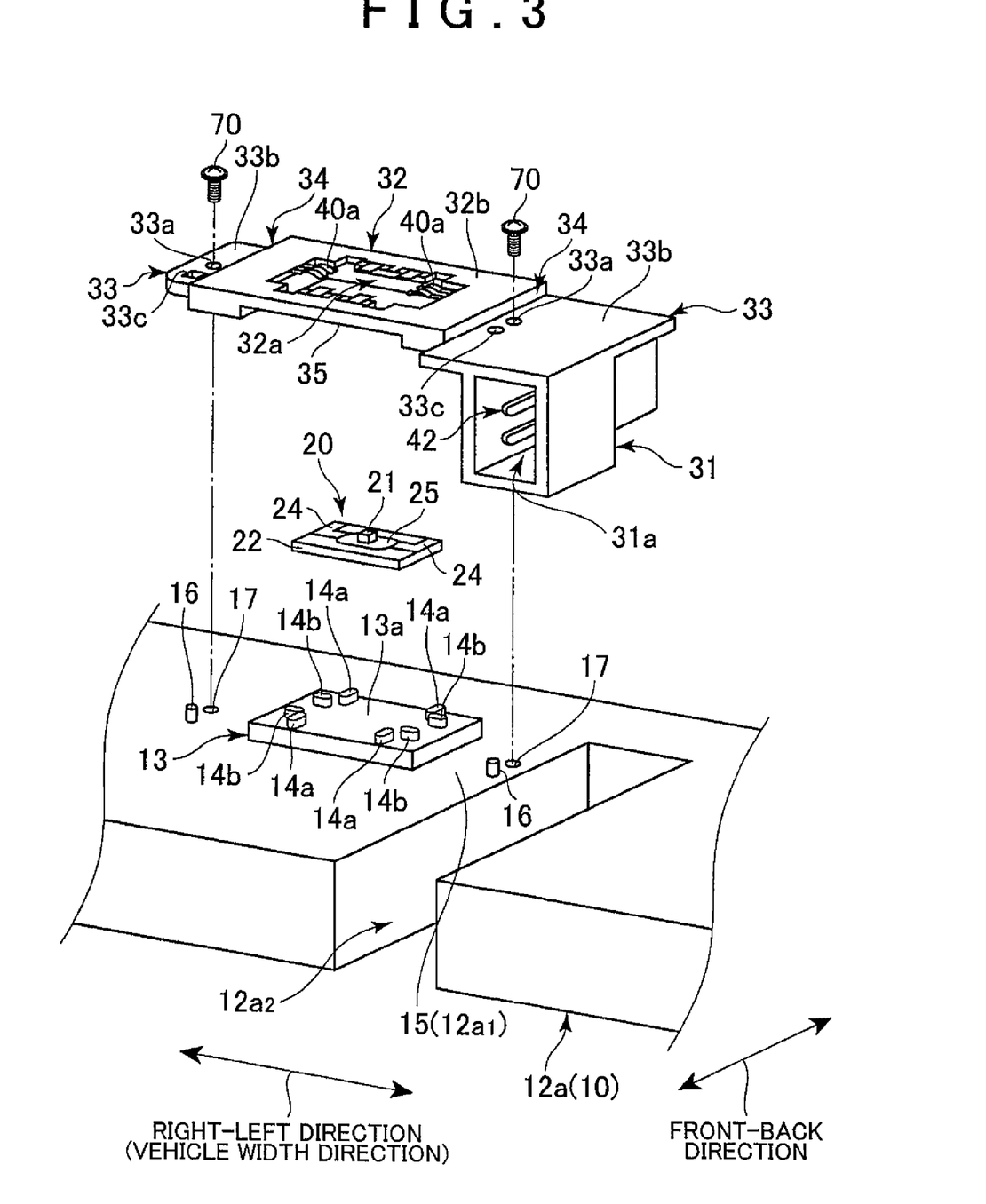
FIG. 3 is an exploded perspective view of a fixation structure of an LED module according to the embodiment.
Figure 4:
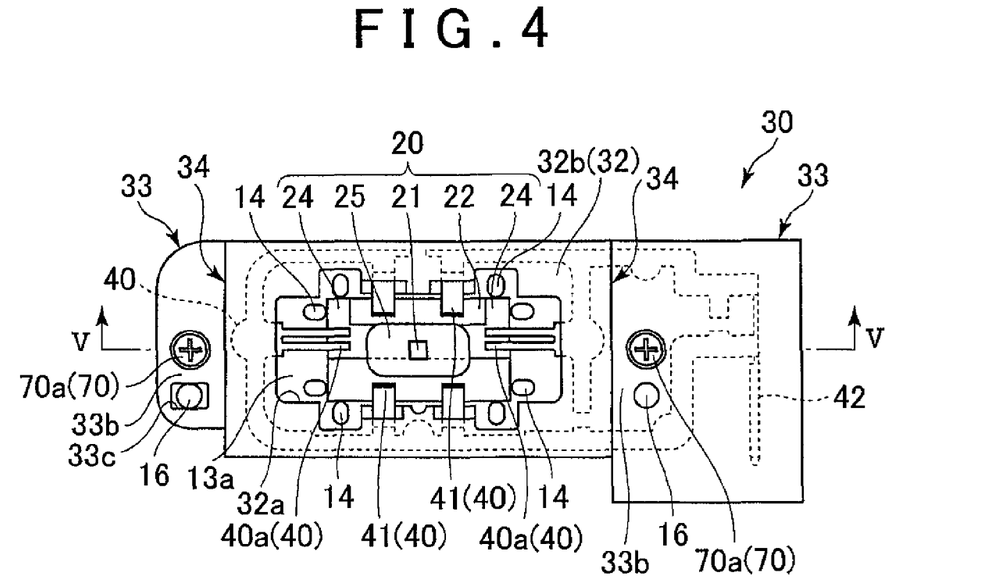
FIG. 4 is a plan view of the fixation structure of the LED module according to the embodiment.
Figure 5:
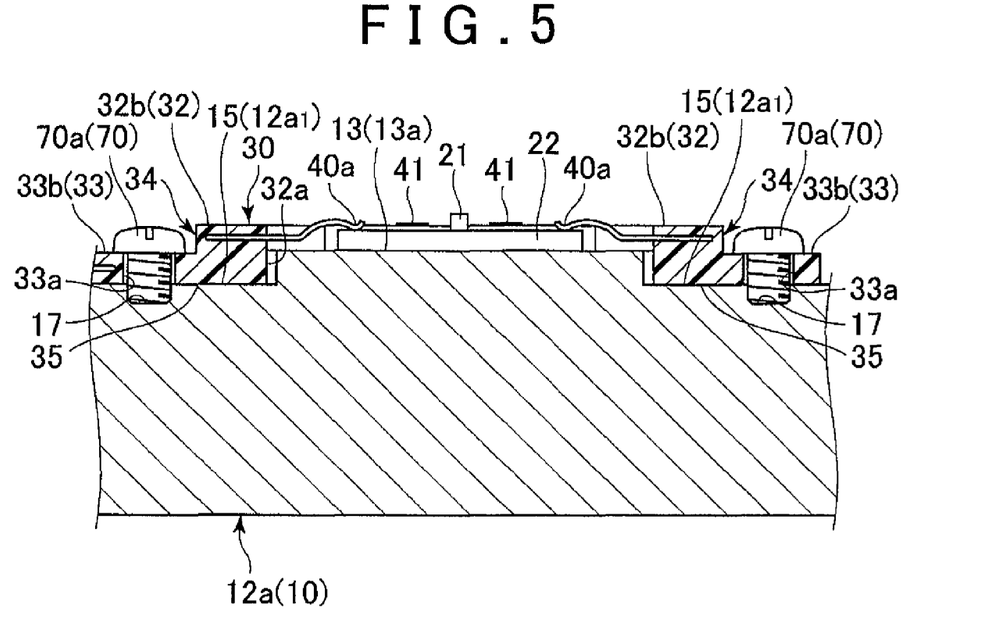
FIG. 5 is a longitudinal sectional view (i.e., a sectional view taken along line V-V in FIG. 4) of the fixation structure of the LED module according to the embodiment.

The attachment 30 is a generally frame-shaped flat plate member that has a predetermined thickness and is slightly larger than the outer shape of the LED module 20, as shown in FIGS. 3 to 5. The attachment 30 is a resin product in which i) a frame portion 32 that has a generally rectangular opening 32a, provided in substantially a center portion, that matches the outer shape of the LED positioning protrusions 14 and the power supply substrate 22 of the LED module 20, ii) a screw fastening portion 33 provided on both ends of the frame portion 32 in the longitudinal direction of the frame portion 32, and iii) a socket portion 31 that includes an open portion 31a that is formed below one side of the screw fastening portion 33 and houses a power supply side power supply terminal 42, are all integrally formed.

Also, a metal wiring body 40 is insert molded in the attachment 30 (i.e., in the frame portion 32 and the screw fastening portion 33 on the side, on which the socket portion 31 is provided). This wiring body 40 is electrically connected to the power supply side power supply terminal 42 provided in the socket portion 31 (i.e., the open portion 31a). The wiring body 40 is suitably insulated such that current flows appropriately.

Also, screw mounting holes 33a for mounting (i.e., fixing) the attachment 30 to the heat sink 10, and positioning holes 33c (see FIGS. 4 and 9) for positioning the attachment 30 on the heat sink 10, are provided in the screw fastening portion 33 of the attachment 30, as shown in FIGS. 3 and 4. The attachment positioning protrusions 16 engage with the positioning holes 33c, and attachment mounting screws 70 are inserted into the screw mounting holes 33a from the front surface (i.e., the surface on the side opposite to the mounting surface 35 that is attached to the heat sink 10) side, and screwed into the attachment mounting screw holes 17 provided in the heat sink 10. As a result, heads 70a of attachment mounting screws 70 are attached to the front surface (hereinafter, simply referred to as the "screw mounting seating surface") 33b of the screw fastening portion 33.

Figure 9:
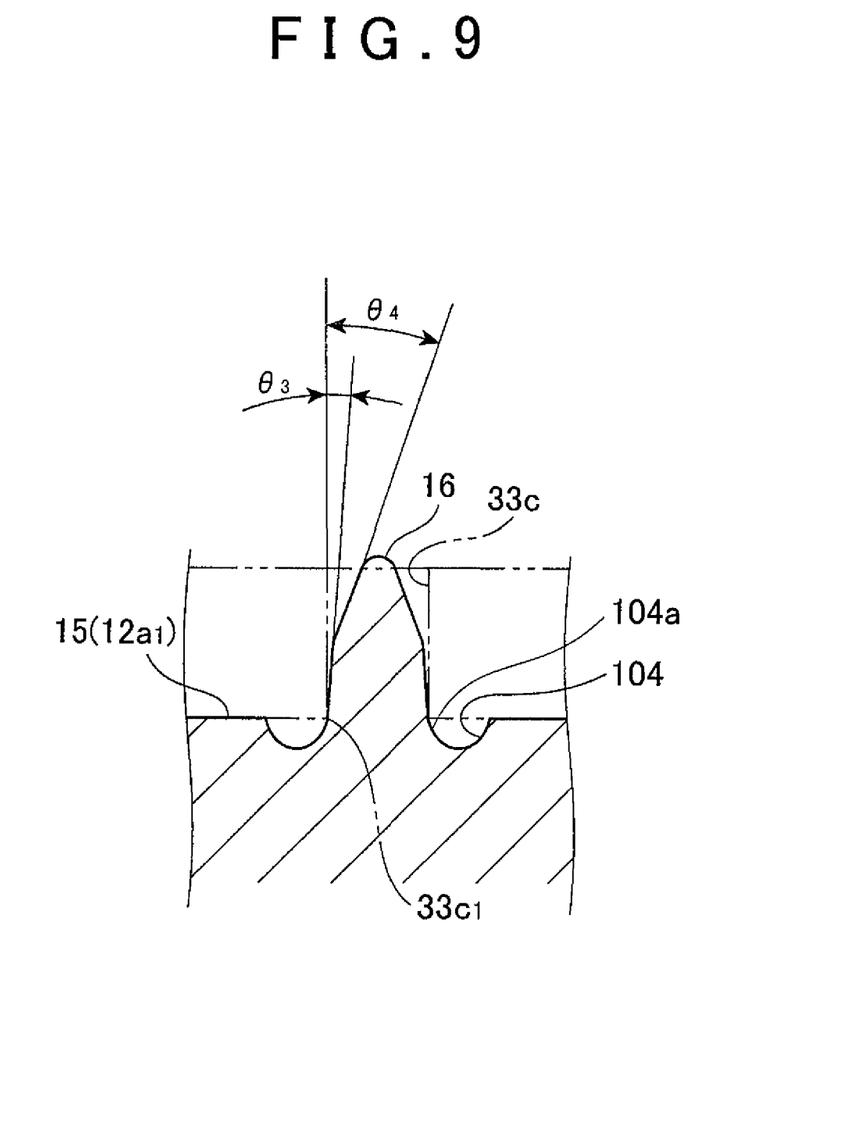
FIG. 9 is an enlarged longitudinal sectional view (i.e., a sectional view taken along line IX-IX in FIG. 6) of an attachment positioning protrusion.

Also, a groove 104 is arranged around the outer peripheral surface of each of the protrusions 16, as shown in the enlarged view in FIG. 9, at the base side of the attachment positioning protrusions 16 that are provided protruding on the attachment mounting surface 15 ($12a_1$). The outer peripheral surface of each of the protrusions 16 extends to below the level of the attachment mounting surface 15 (120, forming a side surface 104a of the groove 104. That is, the outer peripheral surface of the protrusion 16 is continuous with the side surface 104a of the groove 104, and the outer peripheral surface of the protrusion 16 is substantially perpendicular to the attachment mounting surface 15 ($12a_1$). Therefore, it is ensured that peripheral edge corner portions 33c1 of the positioning holes 33c on the attachment 30 side engage with the base outer peripheral surface of the protrusions 16 and the bottom surface of the attachment 30 abut the attachment mounting surface 15 ($12a_1$) and in this way, the attachment 30 is positioned. As a result, the attachment 30 is accurately positioned with respect to the attachment mounting surface 15 ($12a_1$).

In addition, a die extraction taper angle θ3 (for example, 5°) is provided at the base side of the attachment positioning protrusions 16 that are provided protruding on the attachment mounting surface 15 (120, and a taper angle θ4 (for example, 20°) is provided at the tip end side of the protrusions 16, so that the protrusions 16 smoothly engage with the positioning holes 33c of the attachment 30.

In addition, a counterbore portion is formed by providing a step 34 between the screw fastening portion 33 and the frame portion 32 of the attachment 30.

That is, the heads 70a of the attachment mounting screws 70 are offset lower to the mounting surface 35 side, on which the attachment 30 is attached to the heat sink 10, by more than the thickness of the screw heads 70a, so that the screw mounting seating surface 33b of the attachment 30 is formed at a lower position than the front surface 32b of the frame portion 32 so that light emitted from the LED chip 21 that heads toward a reflector 52 or a projection lens 56 will not be blocked by the heads 70a of the attachment mounting screws 70 when the LED module 20 is fixed to the heat sink 10 via the attachment 30 (see FIG. 5).

In addition, part of the wiring body 40 is formed so that LED current-carrying terminals (first current-carrying terminals) 40a, tip end of which are bent downward, extend in a two-pronged manner from both wall surfaces on the short sides of the opening 32a, through which the LED module 20 is exposed, when the attachment 30 is fixed to the heat sink 10 with screws. In addition, substrate retaining portions 41 that are part of the wiring body 40 and extend in a plate spring shape from both wall surfaces on the long sides of the opening 32a are formed at four locations opposing each other. The LED current-carrying terminals 40a function as the LED module pressing portion of the invention.

That is, the LED current-carrying terminals 40a (i.e., the first current-carrying terminals) that electrically contact the power supply portion 24 of the LED module 20 are integrally formed on the opening 32a of the attachment 30, while the power supply side power supply terminals 42 (i.e., second current-carrying terminals) are integrally formed in the socket portion 31 of the attachment 30. As a result, power supplying members for supplying power to the LED module 20 (i.e., members corresponding to the LED current-carrying terminals 40a and the power supply side power supply terminal 42) do not need to be provided separately from the attachment 30, so that the number of parts can be reduced accordingly, and the structure around the LED module 20 (i.e., the light source) is made that much simpler.

In order to fix the LED module 20 that is the light source of the projection light source unit 50 to the upper level portion 12a of the heat sink 10, first a predetermined amount of the heat transfer grease 100 is supplied to substantially the center portion of the substrate mounting surface 13a provided on the heat sink 10, the LED module 20 is then lowered from above and engaged with the region defined by the LED positioning protrusions 14 (14a and 14b), and then the LED module 20 is lowered further to place the power supply substrate 22 on the substrate mounting surface 13a. As a result, the LED module 20 is accurately positioned on the substrate mounting surface 13a, so that the LED chip 21 that is the light source is arranged on the optical axis Ax of the reflector 52 and the projection lens 56 of the projection light source unit 50 that will be described later.

Next, the attachment 30 is then placed over the positioned LED module 20 from above so that the positioning holes 33c of the attachment 30 engage with the attachment positioning protrusions 16 of the heat sink 10. Then, the LED positioning protrusions 14 and the power supply substrate 22 of the LED module 20 are positioned within the opening 32a of the attachment 30, and the LED module 20 is surrounded by the attachment 30 (i.e., the frame portion 32), with the LED chip 21 arranged at the center of the opening 32a. In addition, the LED current-carrying terminals 40a of the attachment 30 contact the power supply portion 24 of the LED module 20, and the substrate retaining portions 41 of the attachment 30 also contact the upper surface of the power supply substrate 22 of the LED module 20. Besides, the screw mounting holes 33a of the attachment 30 and the attachment mounting screw holes 17 of the heat sink 10 become aligned, and the socket portion 31 of the attachment 30 is received in the socket housing recessed portion $12a_2$ of the heat sink 10.

However, in this state, the attachment 30 (i.e., the mounting surface 35 thereof that is attached to the heat sink) is not completely in surface contact with the heat sink 10 (i.e., the attachment mounting surface 15 thereof) due to the reaction to the urging force of the substrate retaining portions 41. Next, in this state, the attachment mounting screws 70 are inserted from the front surface side of the attachment 30 and fastened to the attachment mounting screw holes 17 of the heat sink 10. Consequently, the attachment 30 is pressed toward the mounting surface 35 side, on which the attachment 30 is attached to the heat sink 10, by the clamping force of the attachment mounting screws 70, so that the attachment 30 is fixed with the attachment mounting surface 15 of the heat sink 10 being in surface contact with the mounting surface 35 of the attachment 30 that is attached to the heat sink 10.

Accordingly, the LED module 20 is also fixed in the vertical direction, in addition to the front-back and right-left directions and the circumferential direction, by being sandwiched between the attachment 30 (i.e., the LED current-carrying terminals 40a and the substrate retaining portions 41) and the heat sink 10 (i.e., the substrate mounting surface 13a). That is, the LED module 20 is pressed against and fixed to the substrate mounting surface 13a of the heat sink 10 via the attachment 30 (i.e., the LED current-carrying terminals 40a and the substrate retaining portions 41).

As a result of the attachment 30 being fixed with screws (to the heat sink 10), the power supply portion 24 of the LED module 20 is pressed by the elastic force generated by the deformation of the LED current-carrying terminals 40a of the opening 32a of the attachment 30, so that the contact between the LED current-carrying terminals 40a and the power supply portion 24 is ensured. In this state, when a predetermined power supply connector is inserted into the power supply side power supply terminal 42 inside the socket portion 31 of the attachment 30, power is reliably supplied to the LED module 20 (i.e., the power supply portion 24 thereof) via the power supply side power supply terminal 42 and the LED current-carrying terminals 40a.

Due to the elastic force generated by the deformation of the substrate retaining portions 41 and the LED current-carrying terminals 40a, the lower surface (i.e., the underside) of the power supply substrate 22 of the LED module 20 is pressed against the substrate mounting surface 13a on the heat sink 10 side via the heat transfer grease 100, and thus it is ensured that the lower surface of the power supply substrate 22 is in close contact with the substrate mounting surface 13a. Therefore, the heat dissipating performance of the heat sink 10 increases, so that the light emitting efficiency of the LED chip 21 can be prevented from decreasing.

In this fixed state, the light emission center of the LED chip 21 mounted on the power supply substrate 22 is placed at a position higher than the LED current-carrying terminals 40a, the substrate retaining portions 41 (i.e., the highest portions thereof), and the front surface 32b of the frame portion 32 of the attachment 30. The heads 70a of the attachment mounting screws 70 are offset toward the mounting surface 35 side, on which the attachment 30 is attached to the heat sink 10, by the step 34 between the frame portion 32 and the screw fastening portion 33 of the attachment 30, and thus do not protrude above the front surface 32b of the frame portion 32.

Meanwhile, on the reflective light source unit 60 side, the attachment 30 covers, from below, the LED module 20 that is mounted facing downward on the light source base 13 provided on the lower surface $12b_1$ of the lower level portion 12b of the heat sink 10, and fixed similarly to the projection light source unit 50. The heads 70a of the attachment mounting screws 70 do not protrude below the front surface 32b of the frame portion 32 because they are offset toward the mounting surface 35 side, on which the attachment 30 is attached to the heat sink 10, by the step 34.

Next, the projection light source unit 50 and the reflective light source unit 60 will be described.

The projection light source unit 50 is formed of a resin reflector 52, a resin projection lens 56, and a resin shade 54.

The reflector 52 has a reflective surface that has a generally elliptical surface shape, and is arranged above the LED module 20 when the projection light source unit 50 is fixed to the heat sink 10 with screws. By arranging the LED chip 21 at a first focal point F1 of an ellipse that forms a vertical cross-section of this reflective surface, the light from the LED chip 21 substantially converges on a second focal point F2 of the ellipse. Further, an image of the light source formed on the plane at the focal point F2 is projected forward in the form of a reverted image by the projection lens 56 arranged in front of the light source (i.e., the LED chip 21). A pair of fixing legs 52a each having an opening that engages with a hook portion 54c of the shade 54 that will be described later is provided one on each of the right and left sides of the reflector 52.

The shade 54 is a member that blocks some of the reflected light from the reflective surface of the reflector 52, and thus forms a cutoff line. A lens holder 54a for attaching the projection lens 56 is formed integrally with the shade 54 at a tip end of the shade 54, and a boss 54b that is provided with a female screw portion on an inner periphery thereof is formed integrally with the shade 54 at a back surface of the shade 54. The fixing hook portions 54c engage with the fixing legs 52a of the reflector 52 using their lance-like shape are provided on both outer side surfaces at the rear of the upper surface of the shade 54.

Then, the projection lens 56 is fitted into the lens holder 54a of the shade 54 to fix the projection lens 56 to the shade 54, and the reflector 52 is fixed to the shade 54 by engaging the fixing legs 52a (i.e., the open portions thereof) with the hook portions 54c using the lance-like shape of the hook portions 54c. In this way, the projection light source unit 50 in which the projection lens 56 and the reflector 52 are accurately fixed to the shade 54 is obtained.

To fix the projection light source unit 50 to the heat sink 10, the boss 54b on the back surface of the shade 54 is aligned with a screw insertion hole 11a provided in the perpendicular panel portion 11 of the heat sink 10, and a light source unit fixing screw 71 is inserted into the screw insertion hole 11a from the back surface side of the heat sink 10 and screwed into the female screw portion provided on the inner periphery of the boss 54b of the shade 54. As a result, the projection light source unit 50 in which the projection lens 56 and the reflector 52 have been integrated with the shade 54 is firmly fixed to the heat sink 10 via the shade 54.

Meanwhile, the reflective light source unit 60 is arranged below the LED module 20 for the reflective light source unit 60, as a parabola reflector 62 that is made of resin. This reflector 62 has a reflective surface that is a paraboloidal surface that has a focal point near the LED module 20, and reflects forward the light emitted from the LED chip 21, thereby radiating the light as substantially parallel light (i.e., diffusive radiation in a horizontal direction). A boss 62b provided with a female screw portion inside thereof is formed extending outward on substantially a center portion on the back surface side of the reflector 62 as well. This boss 62b and a screw insertion hole 11b are aligned, and a light source unit fixing screw 71 is inserted into the screw insertion hole 11b from the back surface side of the heat sink 10 and screwed into the female screw portion of the boss 62b. As a result, the reflective light source unit 60 is directly and firmly fixed to the heat sink 10.

According to the structure described above, the LED module 20, and the projection light source unit 50 and the reflective light source unit 60 that are the light distributing members are all accurately fixed to the same member (i.e., the heat sink 10).

That is, in the projection light source unit 50, the LED chip 21 (i.e., the LED module 20) that is the light source is directly positioned on and fixed to the light source base 13 of the heat sink 10, so that a high accuracy in the fixation position is achieved. In addition, the reflector 52 and the projection lens 56 are fixed in a state where these are accurately positioned with respect to the light source base 13 (via the shade 54), so that the relative position accuracy of the reflector 52 and the projection lens 56 with respect to the LED chip 21 that is the light source is high.

As a result, the optical axes of these are aligned, so that the light emitted from the LED chip 21 accurately enters the reflector 52 and the projection lens 56. Because the high relative position accuracy of the reflector 52 and the projection lens 56 with respect to the LED chip 21 is achieved, the light that enters the reflector 52 is accurately reflected by the reflector 52, and thus accurately emitted in front of the vehicle by the projection lens 56.

Meanwhile, with the reflective light source unit 60, the fixing position accuracy of the LED chip 21 is high and at the same time, the relative position accuracy of the reflector 62 with respect to the LED chip 21 is also high because the reflector 62 is also directly fixed to the heat sink 10 with screws, so that. As a result, the light from the LED chip 21 accurately enters the reflector 62 and is reflected toward the front of the vehicle with high accuracy by the reflector 62.

Accordingly, with the vehicular front lamp 1, better light distribution performance enables a sophisticated light distribution pattern to be formed in front of the vehicle.

Furthermore, the light emission center of the LED chip 21 that is the light source is positioned higher, in the projection light source unit 50, and lower, in the reflective light source unit 60, than the front surface 32b of the frame portion 32 of the attachment 30, the LED current-carrying terminals 40a, and the substrate retaining portions 41 (i.e., the highest portions thereof). Besides, the heads 70a of the attachment mounting screws 70 on the screw mounting seating surface 33b do not protrude above the front surface 32b of the frame portion 32 in the projection light source unit 50 and do not protrude below the front surface 32b of the frame portion 32 in the reflective light source unit 60. Therefore, the heads 70a of the attachment mounting screws 70 do not appear in the light path of the light headed from the light emission center of the LED (i.e., the LED chip 21) toward the optical elements (i.e., the reflectors 52 and 62 and the projection lens 56).

That is, neither the light emitted from the LED chip 21 toward the reflector 52 (62) nor the light emitted therefrom toward the projection lens 56 will be blocked by the heads 70a of the attachment mounting screws 70 (vignetting will not occur).

Accordingly, all of the light emitted from the LED chip 21 heads toward the reflector 52 (62) or the projection lens 56 that are light distribution controlling elements, so that the light emitted from the LED chip 21 is efficiently used without being wasted, and thus the flux utilization factor of the vehicular front lamp 1 will not decrease.

In the embodiment described above, a total of eight of the LED positioning protrusions 14 are provided in the four corners. However, as long as the LED positioning protrusions 14 are able to perform positioning in the front-back and right-left directions (i.e., the two-dimensional directions) and the circumferential direction, the positions where the LED positioning protrusions 14 are provided are not limited to the four corners, and the number of LED positioning protrusions 14 is not limited to eight.

Further, in the embodiment described above, the LED positioning protrusions 14 are formed having an elliptical cross section, but they may also be formed having a circular cross section or a rectangular cross section.

In the embodiment described above, the inclined surfaces (planar surfaces) $14a_1$ and $14b_1$, which function as tapered portions, are formed on the side of the tip end portions of the LED positioning protrusions 14, the side facing the substrate mounting surface 13a. However, the inclined surfaces $14a_1$ and $14b_1$ may have an arc shape in cross section.

In the above description, a fastening screw is used as the attachment fixing member. However, other than a fastening screw, a rivet or a plate spring or the like may also be used as the attachment fixing member.

A configuration may be employed, in which the projection light source unit 50 includes no projection lens 56. In this case, when assembling the vehicular front lamp 1, the projection lens 56 may be arranged at a predetermined position in front, in the direction of the optical axis Ax, of the projection light source unit 50.

In the description above, the reflector 52 (62) and the projection lens 56 are examples of the optical element of the invention.

The vehicular lamp is not limited to a vehicular front lamp. For example, the vehicular lamp may also be used as a headlamp, a fog lamp, and a bending lamp, and the like. In the invention, instead of a white LED, an infrared LED may be used. Aside from an LED, a semiconductor laser may also be used as the light source.

A structure may be employed, in which heat transfer grease is filled between the power supply substrate and the substrate mounting surface, and the groove functions as a grease pit that catches excess grease when the LED module is pressed against and fixed to the substrate mounting surface.

To attach the LED module to the substrate mounting surface, first heat transfer grease (that is gel-like) is supplied to the substrate mounting surface. Next, the LED module is placed onto the substrate mounting surface. Finally, the LED module is pressed against and fixed to the substrate mounting surface by fixing the attachment to the heat sink so as to cover the LED module.

When the LED module is pressed against and fixed to the substrate mounting surface via the attachment, the heat transfer grease supplied to substantially the center portion of the substrate mounting surface is pressed so that it spreads outward along the substrate mounting surface. As a result, the power supply substrate is brought into close contact with the substrate mounting surface via a thin film-like layer of the heat transfer grease.

That is, the heat transfer grease filled between the power supply substrate and the substrate mounting surface increases the closeness of contact between the power supply substrate and the substrate mounting surface, and thus promotes the transfer of heat generated on the LED module side to the substrate mounting surface side. As a result, the efficiency in transferring heat generated by the LED module that is the light source to the heat sink increases.

Further, when the LED module is pressed against and fixed to the substrate mounting surface, excessive part of the heat transfer grease filled between the power supply substrate and the substrate mounting surface (hereinafter, simply referred to as "excess grease") does not leak out to the outside of the power supply substrate, but is instead led to the grease pit and is retained there. As a result, excess grease will not adhere to the area around the LED module and make it dirty, or cause a short to occur in the current path of the LED module. According to this structure, a vehicular lamp, in which excess grease will not adhere to the area around the LED module, is able to be provided, and with which appropriate light distribution using an LED that is the light source is obtained over an even greater extended period of time.

Also, the power supply substrate may be formed in a rectangular shape in a plan view, and the positioning protrusions may be provided in the four corners on the substrate mounting surface that has a rectangular shape in a plan view that matches the outer shape of the power supply substrate. With the LED module, the very small LED chip that is mounted on the power supply substrate is a light-emitting portion, and if the position of the LED chip is misaligned even slightly in not just the two-dimensional directions, but the circumferential direction, the light distribution created by the light source unit will be different, so that it is desirable that the LED module be positioned in both the two-dimensional directions and the circumferential direction, with respect to the substrate mounting surface.

Also, the power supply substrate is typically formed in a rectangular shape in a plan view. By providing the positioning protrusions near the four corners that are positions as far apart as possible from each other on the substrate mounting surface that is rectangular in a plan view, and making portions of the power supply substrate near the four corners abut these positioning protrusions, the accuracy with which the LED module is positioned with respect to the substrate mounting surface is increased.

Also, the contact area between the power supply substrate and the substrate mounting surface is reduced by an amount corresponding to the area of the grooves (i.e., the grease pits) and therefore, the efficiency in transferring heat to the heat sink may decrease. However, the grooves (i.e., the grease pits) are provided near the four corners of the substrate mounting surface that is rectangular in a plan view, and moreover, with the LED module, even though the amount of heat generated near the center portion of the power supply substrate, which is rectangular in a plan view and on which the LED chip is mounted, is large, the amount of heat generated near the four corners is small. That is, the influence of the decrease in the heat transfer efficiency is limited to only the four corners of the substrate mounting surface that correspond to the four corners of the power supply substrate where the amount of heat generated is small. Therefore, the decrease in the heat transfer efficiency of the substrate mounting surface as a whole is small and therefore, there is almost no influence on the efficiency in transferring heat generated by the LED module that is the light source to the heat sink.

That is, in the LED module, the amount of heat that is generated is large near the center portion of the power supply substrate, which is rectangular in a plan view and on which the LED chip is mounted, and is small near the peripheral edge portion. In particular, the amount of heat that is generated is the lowest near the four corners of the power supply substrate. Therefore, according to one structure, the heat transfer from the LED module to the substrate mounting surface side is ensured by making the overall power supply substrate be in close contact with the substrate mounting surface via the heat transfer grease and at the same time, the grooves (i.e., the grease pits) are provided near the four corners of the substrate mounting surface where there is almost no influence on the total amount of transfer heat from the power supply substrate to the overall substrate mounting surface, even if the heat transfer is impeded, due to the fact that the amount of heat generated there is the smallest. According to this structure, a vehicular lamp, in which the LED module is reliably positioned not only in the two-dimensional directions but also in the circumferential direction, on the substrate mounting surface, and with which appropriate light distribution using an LED that is the light source is obtained over an extended period of time, is provided.

A tapered portion that guides the LED module to the substrate mounting surface may be formed on at least a side of a tip end portion of each of the positioning protrusions, the side of the tip end portion facing the substrate mounting surface. To place the LED module on the substrate mounting surface, the LED module is lowered from a position above the substrate mounting surface so as to engage with the region surrounded by the plurality of positioning protrusions while being kept parallel. The area (i.e., the amount of space) surrounded by the tip end portions of the positioning protrusions is somewhat larger than the area (i.e., the amount of space) of the substrate mounting surface because the tapered portions are formed on the tip end portions of the protrusions, so that the LED module easily engages with the region surrounded by the tip end portions of the positioning protrusions. When the LED module (i.e., the power supply substrate thereof) is lowered, the side edge portions of the power supply substrate slide along the tapered portions of the tip end portions of the positioning protrusions, so that the work of placing the LED module (i.e., the power supply substrate thereof) on the substrate mounting surface can be performed smoothly. According to this structure, the work of placing the LED module onto the substrate mounting surface can be performed smoothly, so that the time required for the process of mounting the LED module can be reduced.

The optical element may include a reflector that reflects the light from the light source in a predetermined direction, and the reflector may be fixed to the heat sink either directly or via another member.

The LED module is fixed to the heat sink, and the reflector is fixed to the heat sink either directly or via another member, so that the light source (i.e., the LED chip) and the reflector are fixed to the same member (i.e., the heat sink), which improves the relative position accuracy of the light source (i.e., the LED chip) and the reflector. According to this structure, the light emitted from the light source (i.e., the LED chip) is accurately reflected via the reflector because the relative position accuracy of the light source (i.e., the LED chip) and the reflector is high. As a result, a highly accurate light distribution pattern is created in front of the vehicle, so that the light distribution performance of the vehicular lamp is increased.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A vehicular lamp comprising:
a lamp chamber defining portion that defines a lamp chamber therein;
a light source unit that is housed in the lamp chamber and includes a light emitting diode (LED) that is a light source, and an optical element that controls a light distribution of light from the light source in a predetermined direction; and
a heat sink to which the light source unit is attached, wherein
the LED is provided in a form of an LED module, in which an LED chip is mounted to a power supply substrate;
the LED module is pressed against and fixed to a substrate mounting surface provided at a predetermined position on the heat sink, by a frame-shaped attachment that has an LED module pressing portion;
a plurality of positioning protrusions that abut an outside edge of the power supply substrate of the LED module are provided around the substrate mounting surface; and
a groove that extends along an outer peripheral surface of each of the protrusions is provided on at least a side of a base of each of the protrusions, the side of the base facing the substrate mounting surface, wherein
the power supply substrate is formed having a rectangular shape in a plan view, and
the positioning protrusions are provided at four corners of the substrate mounting surface that has a rectangular shape in a plan view that matches an outer shape of the power supply substrate.

2. The vehicular lamp according to claim 1, wherein
heat transfer grease is interposed between the power supply substrate and the substrate mounting surface, and
the groove is formed so as to function as a grease pit that catches excess grease when the LED module is pressed against and fixed to the substrate mounting surface.

3. The vehicular lamp according to claim 1, wherein
the groove is formed only near each of the four corners.

4. The vehicular lamp according to claim 1, wherein
two of the positioning protrusions are provided at each of the positions of the four corners and abut the power supply substrate on two adjacent sides of the rectangular shape of the power supply substrate.

5. The vehicular lamp according to claim 1, wherein
the optical element includes a reflector that reflects the light from the light source in a predetermined direction, and
the reflector is fixed to the heat sink either directly or via another member.

6. A vehicular lamp comprising:
a lamp chamber defining portion that defines a lamp chamber therein;
a light source unit that is housed in the lamp chamber and includes a light emitting diode (LED) that is a light source, and an optical element that controls a light distribution of light from the light source in a predetermined direction; and
a heat sink to which the light source unit is attached, wherein
the LED is provided in a form of an LED module, in which an LED chip is mounted to a power supply substrate;
the LED module is pressed against and fixed to a substrate mounting surface provided at a predetermined position on the heat sink, by a frame-shaped attachment that has an LED module pressing portion;
a plurality of positioning protrusions that abut an outside edge of the power supply substrate of the LED module are provided around the substrate mounting surface; and
a groove that extends along an outer peripheral surface of each of the protrusions is provided on at least a side of a base of each of the protrusions, the side of the base facing the substrate mounting surface, wherein
a tapered portion that guides the LED module to the substrate mounting surface is formed on at least a side of a tip end portion of each of the positioning protrusions, the side of the tip end portion facing the substrate mounting surface.

7. The vehicular lamp according to claim 6, wherein
heat transfer grease is interposed between the power supply substrate and the substrate mounting surface, and
the groove is formed so as to function as a grease pit that catches excess grease when the LED module is pressed against and fixed to the substrate mounting surface.

8. The vehicular lamp according to claim 6, wherein
the optical element includes a reflector that reflects the light from the light source in a predetermined direction, and
the reflector is fixed to the heat sink either directly or via another member.

9. A vehicular lamp comprising:
a lamp chamber defining portion that defines a lamp chamber therein;
a light source unit that is housed in the lamp chamber and includes a light emitting diode (LED) that is a light source, and an optical element that controls a light distribution of light from the light source in a predetermined direction; and
a heat sink to which the light source unit is attached, wherein
the LED is provided in a form of an LED module, in which an LED chip is mounted to a power supply substrate;
the LED module is pressed against and fixed to a substrate mounting surface provided at a predetermined position on the heat sink, by a frame-shaped attachment that has an LED module pressing portion;
a plurality of positioning protrusions that abut an outside edge of the power supply substrate of the LED module are provided around the substrate mounting surface; and
a groove that extends along an outer peripheral surface of each of the protrusions is provided on at least a side of a base of each of the protrusions, the side of the base facing the substrate mounting surface, wherein
an outer peripheral surface of each of the positioning protrusions that abuts the outside edge of the power supply substrate is substantially perpendicular to a plane that includes the substrate mounting surface.

10. The vehicular lamp according to claim 9, wherein
heat transfer grease is interposed between the power supply substrate and the substrate mounting surface, and
the groove is formed so as to function as a grease pit that catches excess grease when the LED module is pressed against and fixed to the substrate mounting surface.

11. The vehicular lamp according to claim 9, wherein
the optical element includes a reflector that reflects the light from the light source in a predetermined direction, and
the reflector is fixed to the heat sink either directly or via another member.

* * * * *